United States Patent
Furi

(10) Patent No.: US 11,060,725 B2
(45) Date of Patent: Jul. 13, 2021

(54) METHOD FOR MINIMIZING FORCES ACTING ON TURBINE BLADES IN SPECIFIC FREQUENCY RANGES

(71) Applicant: Siemens Aktiengesellschaft, Munich (DE)

(72) Inventor: Marc Furi, Dorval (CA)

(73) Assignee: SIEMENS ENERGY GLOBAL GMBH & CO. KG, Munich (DE)

(*) Notice: Subject to any disclaimer, the term of this patent is extended or adjusted under 35 U.S.C. 154(b) by 190 days.

(21) Appl. No.: 16/476,354

(22) PCT Filed: Feb. 8, 2017

(86) PCT No.: PCT/US2017/016881
§ 371 (c)(1),
(2) Date: Jul. 8, 2019

(87) PCT Pub. No.: WO2018/147837
PCT Pub. Date: Aug. 16, 2018

(65) Prior Publication Data
US 2020/0003415 A1   Jan. 2, 2020

(51) Int. Cl.
*F23R 3/34* (2006.01)
*F23N 5/24* (2006.01)
*G01H 13/00* (2006.01)

(52) U.S. Cl.
CPC ............ *F23N 5/242* (2013.01); *F23R 3/34* (2013.01); *G01H 13/00* (2013.01)

(58) Field of Classification Search
CPC .. F23R 3/34; F23R 3/346; F23R 2900/00005; F01D 25/06
See application file for complete search history.

(56) References Cited

U.S. PATENT DOCUMENTS

| 6,125,626 | A | 10/2000 | El-Aini et al. |
| 10,533,424 | B2* | 1/2020 | Fielding .................. F01D 5/28 |
| 2001/0047650 | A1* | 12/2001 | Muller ...................... F02C 9/28 |
| | | | 60/776 |
| 2009/0077945 | A1 | 3/2009 | Cornwell et al. |
| 2015/0345402 | A1 | 12/2015 | Crothers et al. |
| 2016/0320767 | A1 | 11/2016 | Brummel et al. |

FOREIGN PATENT DOCUMENTS

| EP | 2594913 A1 | 5/2013 |
| RU | 2393363 C1 | 6/2010 |
| RU | 2567530 C1 | 11/2015 |

OTHER PUBLICATIONS

Szasz et al., "Hub-Based Vibration Control of Multiple Rotating Airfoils", Journal of Propulsion and Power, Insittute of Aeronautics and Astronautics, New York, US, vol. 16, No. 6, Nov.-Dec. 2000, pp. 1155-1163, XP000968259.
PCT International Search Report and Written Opinion of International Searching Authority dated Jun. 2, 2017 corresponding to PCT International Application No. PCT/US2017/016881 filed Feb. 8, 2017.

* cited by examiner

*Primary Examiner* — Katheryn A Malatek

(57) ABSTRACT

A gas turbine engine has a circumferential staging configuration of fuel injectors in a combustor. As a turbine blade revolves within the gas turbine engine it is subjected to lift and drag forces based on the configuration of lit injectors. A configuration of lit injectors that results in the minimum unsteady forces the turbine blade experiences is determined in order to increase the life span of the turbine blade and limit any structural failures.

8 Claims, 3 Drawing Sheets

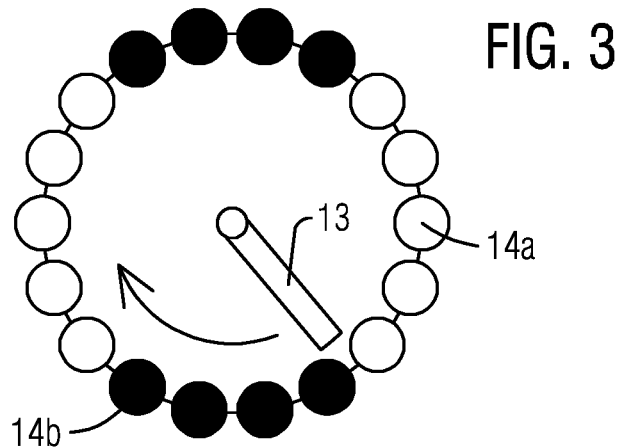
FIG. 3
FIG. 4
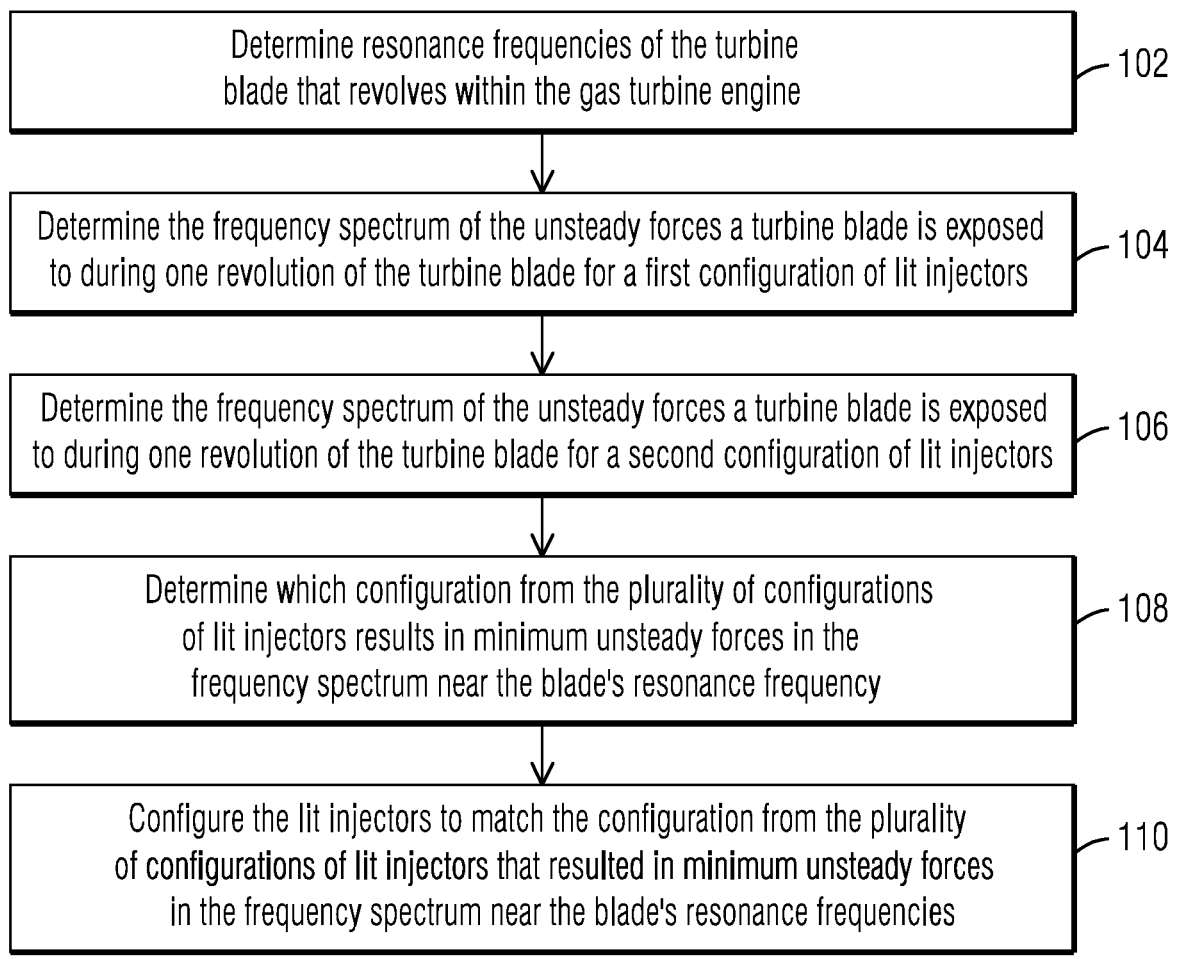

METHOD FOR MINIMIZING FORCES ACTING ON TURBINE BLADES IN SPECIFIC FREQUENCY RANGES

BACKGROUND

1. Field

Disclosed embodiments are generally related to gas turbine engines and more particularly to the combustion and turbine system of a gas turbine engine.

2. Description of the Related Art

Gas turbine engines generate combustion products in combustors. The combustion products are transmitted downstream in the gas turbine engine to rows of rotating turbine blades coupled to a turbine rotor. As the combustion products expand through the turbine section, the combustion products cause the blade assemblies and the turbine rotor to rotate.

In some gas turbine engines circumferential staging is used within the combustors. Circumferential staging is the use of injectors for injecting fuel and air that distributed circumferentially within the combustor. The injectors are activated to alter the power of the gas turbine engine. The use of circumferential staging in gas turbine engines can impact the life span of the turbine blades in the turbine section.

SUMMARY

Briefly described, aspects of the present disclosure relate to configurations of activated injectors within a gas turbine engine.

An aspect of present disclosure may be a method for configuring circumferential staging in a gas turbine engine. The method involves determining resonance frequencies of a turbine blade that revolves within the gas turbine engine. The method also involves determining a frequency spectrum of the unsteady forces the turbine blade is exposed to during one revolution of the turbine blade for a first configuration of lit injectors selected from a plurality of configurations of lit injectors; determining a frequency spectrum of the unsteady forces the turbine blade is exposed to during one revolution of the turbine blade for at least one other configuration of lit injectors selected from the plurality of configurations of lit injectors, wherein the at least one other configuration of lit injectors is different than the first configuration of lit injectors. The method further involves determining which configuration from the plurality of configurations of lit injectors results in minimum unsteady forces that the turbine blade will experience; and configuring the lit injectors in the combustor to match the configuration from the plurality of configurations of lit injectors that resulted in the minimum unsteady forces that the turbine blade will experience.

Another aspect of the present disclosure may be a gas turbine engine having a combustor and a turbine blade that revolves within the gas turbine engine, wherein resonance frequencies of the turbine blade that revolves within the gas turbine engine are determined. The gas turbine engine may also have injectors located within the combustor for performing circumferential staging, wherein a plurality of the injectors are lit based on a determination of a configuration of lit injectors that results in minimum unsteady forces that the turbine blade will experience; wherein the configuration of lit injectors that results in a minimum unsteady forces that the turbine blade will experience is determined by determining a frequency spectrum of unsteady forces the turbine blade is exposed to during one revolution of the turbine blade for a first configuration of lit injectors selected from a plurality of configurations of lit injectors; determining a frequency spectrum of unsteady forces a turbine blade is exposed to during one revolution of the turbine blade for at least one other configuration of lit injectors selected from the plurality of configurations of lit injectors, wherein the at least one other configuration of lit injectors is different than the first configuration of lit injectors; and determining which configuration from the plurality of configurations of lit injectors results in the minimum unsteady forces that the turbine blade will experience.

BRIEF DESCRIPTION OF THE DRAWINGS

FIG. 3 shows a schematic view of injectors and a turbine blade.
FIG. 4 is a flow chart showing the method for configuring circumferential staging for a gas turbine engine.

DETAILED DESCRIPTION

To facilitate an understanding of embodiments, principles, and features of the present disclosure, they are explained hereinafter with reference to implementation in illustrative embodiments. Embodiments of the present disclosure, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

Many gas turbine engines employ lean premixed (LP) combustion to minimize NOx emissions. LP combustion can employ circumferential staging to maintain constant flame temperatures for all engine powers, thereby minimizing pollutant emissions The inventor recognized that using circumferential staging can result in a circumferentially non-uniform temperature profiles. These non-uniform temperature profiles can result in a time varying load on turbine blades during engine revolutions. If the frequency of an unsteady lift force and drag force experienced by the turbine blades at the various turbine stages coincides with the resonance frequencies of the turbine blade, the turbine blade may resonate rapidly and turbine blade failure or release can occur.

Figure 1:
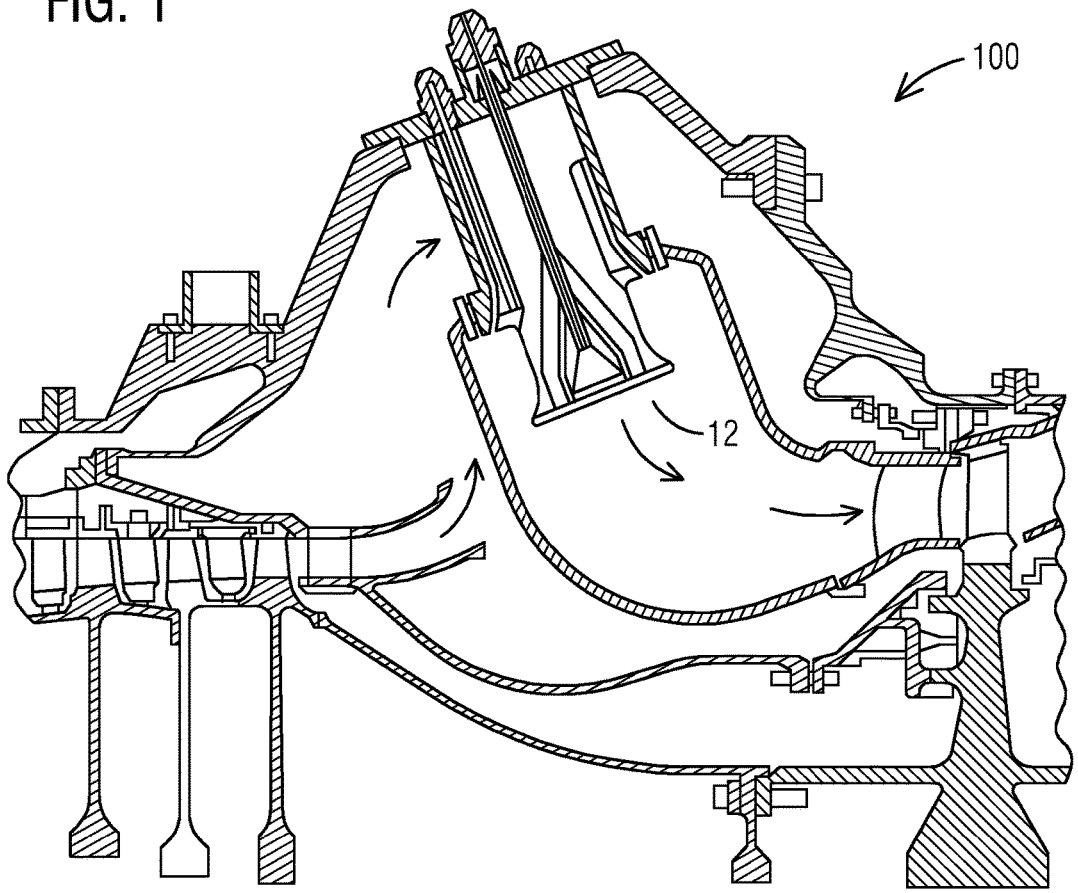
FIG. 1 shows a cut away view of a gas turbine engine.
Figure 2:
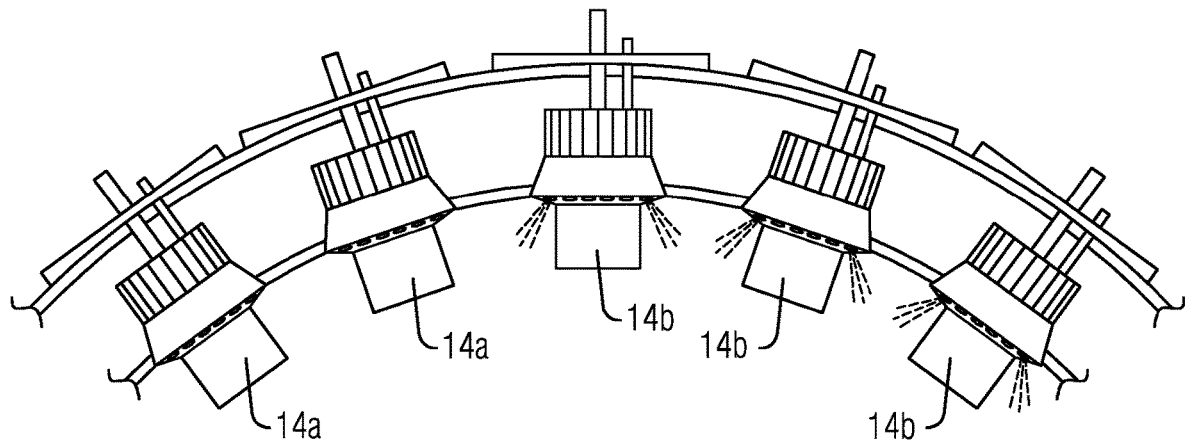
FIG. 2 shows a partial view of a plurality of injectors.

FIG. 1 shows a cutaway view of a gas turbine engine 100 and a combustor 12. Combustor 12 is where combustion for the gas turbine engine 100 occurs. FIG. 2 shows a partial view of the injectors 14a, 14b that are located within the combustor 12. The injectors 14a, 14b can inject fuel within the combustor 12. Injectors 14a are unlit and injectors 14b are lit. By "lit" it is meant that fuel is flowing through injector 14b and mixed with the air flowing through injector 14b before the air and fuel mixture is injected in combustor 12.

FIG. 3 is a schematic view of injectors 14a and 14b. The view shown in FIG. 3 is looking axially upstream into the combustion chamber of the combustor 12. Injector 14a is unlit. Injector 14b is lit. Turbine blade 13 is shown to illustrate the circumferential movement that occurs relative the injectors 14a and 14b. The movement of the turbine blade 13 as it revolves within the gas turbine engine 100 subjects the turbine blade 13 to different temperature, density and velocity profiles.

Typically the lit injectors 14b are arranged in symmetrical banks. More lit injectors 14b are added depending on the power needs of the gas turbine engine 100. However the additions of lit injectors 14b in this symmetrical manner can result in causing the turbine blade 13 resonate rapidly and cause failure or release of the turbine blade 13.

In the configuration shown in FIG. 3 there are four lit injectors 14b located at the top of the configuration and four lit injectors 14b located at the bottom of the configuration. As more power is desired from the gas turbine engine 100 more lit injectors 14b may be added. The lit injectors 14b may be added in various stages depending on the power output needs of the gas turbine engine 100. As the turbine blade 13 traverses its path around the ring of unlit and lit injectors 14a, 14b it is subjected to different temperature and therefore density profiles that are impacting the lift and drag forces it is exposed to.

For example, as turbine blade 13 passes the lit injectors 14b it is subjected to higher temperatures than when it passes the unlit injectors 14a. Then when it passes the lit fuel injectors 14b it is again subjected to the impacts of the heating forces and resultant forces. This generates periodic forces on the blade 13 with a specific frequency. If the frequency of the lift forces and drag forces experienced by the blades 13 at the various turbine stages coincides with their resonance frequencies the blade 13 will resonate rapidly and blade failure or blade release can occur.

In order to address the issues raised by using circumferential staging and thereby retaining the benefit of having constant flame temperatures for all powers, a method has been developed to modify the distribution of lit injectors 14b around the gas turbine engine 100. The distribution of lit injectors 14b results in a circumferential staging configuration that minimizes unsteady forces acting on blades 13 at frequencies near the blade's resonance frequencies. By "unsteady forces" it is meant the unsteady lift forces and drag forces experienced by the turbine blades. By "near" it is meant generally frequencies within the range of 5-40 Hz, preferably within the range of 15-25 Hz. However this range can vary depending upon the number of lit injectors 14b. The range can also be determined by analysing a Cambell diagram of the system and taking the smallest distance between two nodes. That distance is then divided by two in order to determine the range.

Minimizing the unsteady forces acting on blades 13 at frequencies near the blade's resonance frequencies is accomplished by providing a configuration of lit injectors 14b that result in forcing frequencies that do not result in matching the resonance frequencies of the turbine blades 13. "Forcing frequencies" is the frequency of an oscillating applied to a system. Near can be a range of between 5 and 40 Hz. Or it can be determined by looking to a Cambell diagram of the system and taking the distance between two nodes and diving by 2.

The method involves determining the frequency spectrum of the temperature that a turbine blade 13 is exposed to during one engine revolution for one configuration of lit injectors 14b and unlit injectors 14a.

A flow chart illustrating the method for configuring the fuel injectors 14a, 14b of the gas turbine engine 100 is shown in FIG. 4. It should be understood that the method of configuring is generally discussed with respect to gas turbine engines that utilize circumferential staging. However, the method discussed and disclosed herein is applicable to any arrangement of injectors that can benefit from disrupting any pattern that can result in a resonant frequency between a turbine blade 13 and the frequency of unsteady forces acting on it due to the lit injectors 14b.

In step 102 the resonance frequencies of a turbine blade 13 are determined. The resonance frequencies of the turbine blade 13 are generally a property of the physical dimensions of the turbine blade 13 and the material that it is constructed from. These resonance frequencies can be determined based upon finite element analysis for various working temperatures and loads. These resonance frequencies can be depicted in a Campbell diagram. These resonance frequencies are then used in conjunction with the frequency spectrum of unsteady forces acting on the turbine blades 13 generated by a particular configuration of lit injectors 14b. Because this method aims at identifying the configuration of lit injectors 14b with that results in minimum unsteady forces near the resonance frequencies of the turbine blades 13 the frequency spectrum of the temperature history the turbine blade 14b is exposed to is used. Typically, where the frequency of the unsteady and periodic forcing forces and the turbine blade 13 are equal there exists a possibility for the turbine blade 13 to fail or to detach. By minimizing unsteady forces near resonance frequencies of the turbine blade 13 these possibilities will decrease.

In step 104 the frequency spectrum of the unsteady forces the turbine blade 13 is exposed to during one revolution of the turbine blade 13 for a particular configuration of lit injectors 14b is calculated. First, the temperature history T(t) the turbine blade 13 is exposed to during one revolution for a particular configuration of lit injectors 14b is synthetically generated based on the superposition of normal distributions calculated from calibrated computational fluid dynamic simulations representing an unlit injector 14a where the time, t, is a function of the RPMs of turbine blade 13. The value T(t) can include the effect of wake generated by guide vanes and the injection of cooling air. This can be accomplished by knowing the number of guide vanes and a rough estimation of the transverse temperature profile within the gas turbine engine 100 in their wake. The inclusion of the wake effects and cooling air numbers do not need to be extremely accurate since the algorithm works in the frequency domain.

Figure 5:
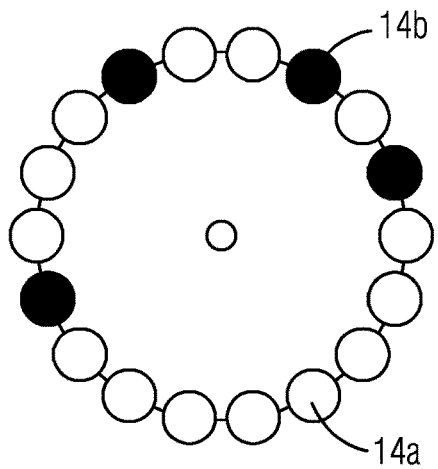
FIG. 5 shows a schematic view of a first configuration of lit injectors.
Figure 6:
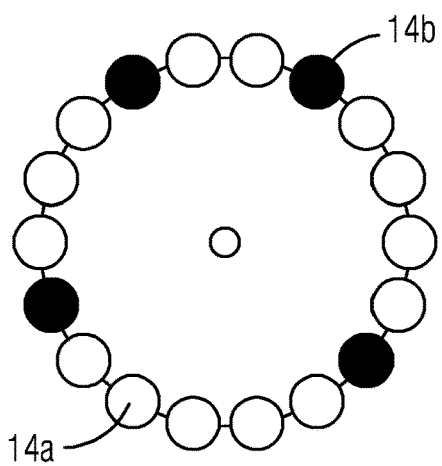
FIG. 6 shows a schematic view of a second configuration of lit injectors.

An example of a configuration of lit injectors 14b is shown in FIG. 5. In step 106 the frequency spectrum of the unsteady forces the turbine blade 13 is exposed to during one revolution of the turbine blade 13 for a second configuration of lit injectors 14b is determined, such as shown in FIG. 6. For purposes of this example only two configurations are discussed, however it should be understood that in practice the frequency spectrum for all unsteady forces may be determined for each possible configuration. Indeed, the frequency spectrums of the unsteady forces for all possible configurations should be determined in order to select the best configuration.

After determining the frequency spectrum of the unsteady forces for the various configurations of lit injectors 14b a determination is made, in step 108, as to what is the minimum unsteady forces with respect to the resonance nodes of the turbine blade 13 the turbine blade 13 will experience for a particular stage of operation. This is accomplished by using the equation min $(\int_{f_{res.}-\Delta}^{f_{res.}+\Delta} FFT(T(t)df)$ (FFT is the fast Fourier Transform of T(t)). As discussed above, T(t) is a synthetic temperature profile constructed from normal distributions calibrated using computational fluid dynamic (CFD) results representing an unlit injector 14a and where the time, t, is a function of the RPMs of turbine blade 13. The value T(t) can include the effect of wake generated by guide vanes and the injection of cooling air. This can be accomplished by knowing the number of guide vanes and a rough estimation of the transverse temperature profile within the gas turbine engine 100 in their wake. The inclusion of the wake effects and cooling air numbers do not need to be extremely accurate since the algorithm works in the frequency domain.

The minimization may be performed for different scenarios that occur in the gas turbine engine 100. The minimization may be performed for just one turbine blade stage or alternatively it may be done by minimizing the sum of unsteady forces near the resonances of turbine blades 13 for several stages. The algorithm can provide the optimal configuration of lit injectors 14b around the gas turbine engine 100 for all possible engine conditions.

An example of a configuration optimizing the unsteady forces near the fundamental resonance of a turbine blade 13 of an industrial Trent 60 is shown in FIG. 5. Previous gas turbine engines would have employed a configuration having two pairs of adjacent lit injectors 14b located 180° apart. The configuration shown in FIG. 5 may result in minimum unsteady forces for the turbine blade 13 than the unsteady energy generated by the configuration shown in FIG. 6. As such the configuration shown in FIG. 5 can be used during the operation of the gas turbine engine 100 during this stage of operation in the gas turbine engine 100 in order to minimize the possibility of having the unsteady energy generate a forcing frequency with a resonance node being equal to the resonance node of the turbine blade 13 and thereby increasing the possibility of the turbine blade 13 to fail or to detach.

While the configuration shown in FIG. 5 is illustrated as resulting in the minimum, it should be understood that during some stages of combustion and with different models of gas turbine engines there may be more than one configuration that results in the same minimum. Note that some of these configurations may be rotationally equal however the nozzle guide vane might destroy this symmetry. In those instances where more than one configuration can result in a minimum, additional criteria may be used to determine which configuration to select. In some instances there may be no additional criteria and the selection of the configuration that results in a minimum may be random. However, in other instances the selection may use criteria such as which configuration results in the best overall performance by using additional turbine stages or minimizing cold-hot interfaces.

Furthermore, while determining the configuration that results in the minimum unsteady forces for the turbine blade 13 is preferable in many situations there may be instances where due to other performance factors of the gas turbine engine 100 the resultant configuration of lit injectors 14b is not desirable. For instance, due to the transient capability of the engine, pollutant emissions or number of required valves. In these instances the configuration that results in minimum unsteady forces for the turbine blade 13 may be altered slightly in order to obtain the overall performance desired for the gas turbine engine 100.

Figure 7:
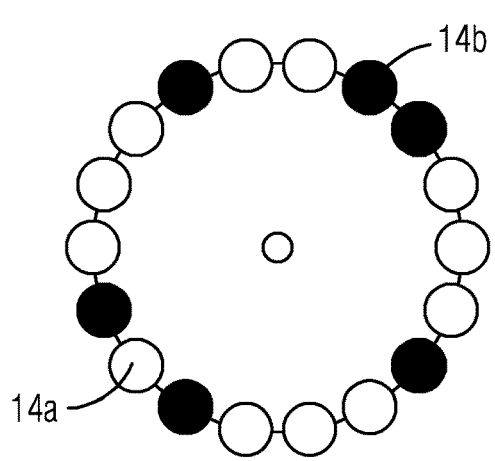
FIG. 7 shows a schematic view of a configuration of lit injectors for a different stage of combustion.

FIG. 7 shows a configuration of lit injectors 14b for a different stage of operation for the gas turbine engine 100. The configuration shown in FIG. 7 again illustrates a result ascertained by employing the method discussed above with respect to FIG. 4. In other words the configuration of lit injectors 14b that best reduces the chances that resonance nodes of the turbine blades 13 be impacted by the unsteady forces and associated frequency of a particular configuration. The method for determining the configuration can be employed each time a new stage is entered.

While embodiments of the present disclosure have been disclosed in exemplary forms, it will be apparent to those skilled in the art that many modifications, additions, and deletions can be made therein without departing from the spirit and scope of the invention and its equivalents, as set forth in the following claims.

What is claimed is:

1. A method for configuring circumferential staging in a gas turbine engine comprising:
   determine resonance frequencies of a turbine blade that revolves within the gas turbine engine;
   determine a frequency spectrum of unsteady forces the turbine blade is exposed to during one revolution of the turbine blade for a first configuration of lit injectors selected from a plurality of configurations of lit injectors;
   determine a frequency spectrum of unsteady forces the turbine blade is exposed to during one revolution of the turbine blade for at least one other configuration of lit injectors selected from the plurality of configurations of lit injectors, wherein the at least one other configuration of lit injectors is different than the first configuration of lit injectors;
   determine which configuration from the plurality of configurations of lit injectors results in minimum unsteady forces that the turbine blade will experience; and
   configure the lit injectors in the combustor to match the configuration from the plurality of configurations of lit injectors that resulted in the minimum unsteady forces that the turbine blade will experience.

2. The method of claim 1, wherein determining the resonance frequencies of the turbine blade comprises determining respective resonance frequencies of at least two stages of turbine blades of the gas turbine engine;
   wherein determining the frequency spectrum of unsteady forces the turbine blade is exposed to during one revolution of the turbine blade for the first configuration of lit injectors comprises determining a sum of unsteady forces the at least two stages of turbine blades are exposed to during one revolution of the at least two turbine blade stages for the first configuration of lit injectors;
   wherein determining the frequency spectrum of unsteady forces the turbine blade is exposed to during one revolution of the turbine blade for the at least one other configuration of lit injectors comprises determining a sum of unsteady forces the at least two stages of turbine blades are exposed to during one revolution of the at least two turbine blade stages for the at least one other configuration of lit injectors;
   wherein determining which configuration of lit injectors results in minimum unsteady forces that the turbine blade will experience comprises determining which configuration of lit injectors results in a minimum sum of unsteady forces the at least two turbine stages will experience; and wherein configuring the lit injectors in the combustor to match the configuration resulting in the minimum unsteady forces that the turbine blade will experience comprises configuring the lit injectors in the combustor to match the configuration resulting in the minimum sum of unsteady forces the at least two stages of turbine blades will experience.

3. The method of claim 1, wherein the configuration from the plurality of lit injectors that results in minimum unsteady forces experienced by the turbine blade is different for turbine blades in at least two stages of the gas turbine engine.

4. The method of claim 1, wherein the minimum unsteady forces that the turbine blade will experience is determined using the equation min $(\int_{f_{res.}-\Delta}^{f_{res.}+\Delta} FFT(T(t)df)$.

5. The method of claim 4, wherein T(t) is a synthetic temperature profile constructed from normal distributions calibrated using computational fluid dynamic (CFD) results representing an unlit injector and t is a function of the revolutions per minute of the turbine blade.

6. The method of claim 4, wherein T(t) includes effects of guide vane wakes.

7. The method of claim 1, wherein the configuration of lit injectors that resulted in minimum unsteady forces that the turbine blade will experience results in unequal spacing between each lit injector.

8. The method of claim 1, wherein both lit and unlit injectors are arranged in an annular configuration.

* * * * *